(12) United States Patent
Hong (10) Patent No.: US 7,680,314 B2
(45) Date of Patent: Mar. 16, 2010

(54) DEVICES, SYSTEMS, AND METHODS FOR IMPROVING IMAGE CONSISTENCY

(75) Inventor: Lin Hong, Monmouth Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 828 days.

(21) Appl. No.: 11/539,662

(22) Filed: Oct. 9, 2006

(65) Prior Publication Data
US 2007/0116347 A1    May 24, 2007

Related U.S. Application Data

(60) Provisional application No. 60/727,577, filed on Oct. 17, 2005.

(51) Int. Cl.
*G06K 9/00* (2006.01)
*G06K 9/34* (2006.01)

(52) U.S. Cl. .................................. 382/131; 382/173

(58) Field of Classification Search ......... 382/128–132, 382/173; 600/431
See application file for complete search history.

(56) References Cited

U.S. PATENT DOCUMENTS

| | | | | |
|---|---|---|---|---|
| 5,633,951 | A * | 5/1997 | Moshfeghi | 382/154 |
| 6,636,647 | B1 * | 10/2003 | Ohki et al. | 382/284 |
| 6,947,040 | B2 | 9/2005 | Tek | |
| 7,015,907 | B2 | 3/2006 | Tek | |
| 7,233,330 | B2 * | 6/2007 | Moreau-Gobard et al. | 345/424 |
| 2001/0031920 | A1 * | 10/2001 | Kaufman et al. | 600/431 |
| 2002/0085748 | A1 * | 7/2002 | Baumberg | 382/154 |
| 2002/0136449 | A1 * | 9/2002 | Park et al. | 382/164 |
| 2003/0095121 | A1 | 5/2003 | Huseyin | |
| 2005/0213800 | A1 * | 9/2005 | Chen et al. | 382/128 |
| 2005/0276455 | A1 * | 12/2005 | Fidrich et al. | 382/128 |

OTHER PUBLICATIONS

Comaniciu et al. ("Mean Shift Analysis and Applications", Proc. IEEE Int. Conf. Computer Vision, ICCV'99, pp. 1197,1203, Kerkyra, Greece, 1999).*
Ayako et al. ("color image segmentation method suing Watershed Algorithm and Contour information", vol. 4, pp. 305-309, IEEE 1999).*
Cheng, "Mean Shift, Mode Seeking, and Clustering", Aug. 1, 1995, IEEE Transactions on Pattern Analysis and Machine Intelligence, 17(8), 790-799.
Comaniciu, "Mean Shift: A Robust Approach Toward Feature Space Analysis", May 1, 2002, IEEE Transactions on Pattern Analysis and Machine Intelligence, 24(5), 603-619.
Fashing, "Mean Shift is a Bound Optimization", Mar. 1, 2005, 4 page(s), IEEE Transactions on Pattern Analysis and Machine Intelligence, 27(3).
Fashing, "Mean Shift is a Bound Optimization; draft for IEEE Transactions on Pattern Analysis and Machine Intelligence", Aug. 27, 2004, 13 page(s), available online: http://www.cs.duke.edu/researchers/artificial_intelligence/PAPERS/fashing/fashing_tpami04.pdf.

(Continued)

*Primary Examiner*—Samir A Ahmed
*Assistant Examiner*—Amara Abdi (57) ABSTRACT

Certain exemplary embodiments can comprise a method, which can comprise automatically rendering an improved image of a target object. The improved image obtained based upon a principal mode of the target object. The principal mode of the target object can be provided to an algorithm that is adapted to derive the improved image of the target object.

19 Claims, 3 Drawing Sheets

OTHER PUBLICATIONS

Masutani, "RBF-based Representation of Volumetric Data: Application in Visualization and Segmentation", 2002, 8 page(s), Springer Berlin; from Medical Image Computing and Computer-Assisted Intervention-MICCAI 2002.

Reitinger, "Tools for Augmented Reality based Liver Resection Planning", 12 page(s), Proceedings of SPIE; Medical Imaging 2004: Visualization, Image-Guided Procedures, and Display, vol. 5367.

* cited by examiner

DEVICES, SYSTEMS, AND METHODS FOR IMPROVING IMAGE CONSISTENCY

CROSS-REFERENCES TO RELATED APPLICATIONS

This application claims priority to, and incorporates by reference herein in its entirety, U.S. Provisional Patent Application Ser. No. 60/727,577, filed 17 Oct., 2005.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
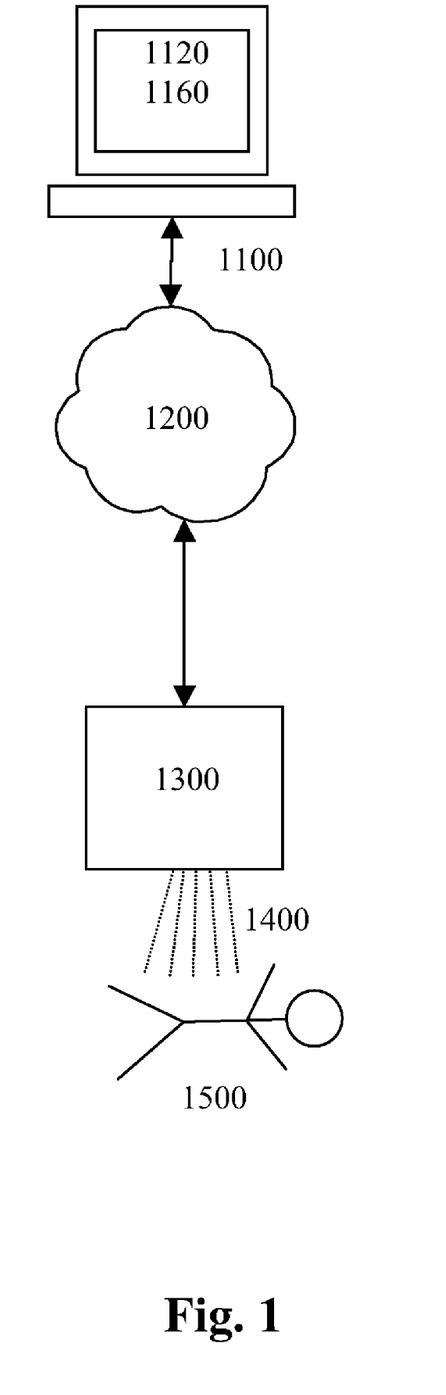
FIG. 1 is a block diagram of an exemplary embodiment of a system 1000.

Certain exemplary embodiments can comprise a method, which can comprise automatically rendering an improved image of a target object. The improved image obtained based upon a principal mode of the target object. The principal mode of the target object can be provided to an algorithm that is adapted to derive the improved image of the target object FIG. 1 is a block diagram of an exemplary embodiment of a system 1000, which can comprise a means for imaging, such as an imaging device 1300. Imaging device 1300 can be any device adapted to provide an image, such as an image of a patient 1500. For example, imaging device 1300 can be a device adapted for imaging, such as medical imaging, such as magnetic resonance (MR) imaging, X-ray imaging, and/or computed tomography (CT) imaging, etc. Imaging data can be obtained regarding patient 1500 via imaging device 1300 utilizing imaging device emissions 1400.

Imaging device 1300 can be communicatively coupled to an information device 1100 via a network 1200. Information device 1100 can comprise a user program 1160, which can be adapted to analyze, process, and/or enhance image data from imaging device 1300. For example, user program 1160 can be adapted to determine a principal mode of a user selected target object, which can be provided to a segmentation algorithm. Information device 1100 can comprise a user interface 1120, which can be adapted to render image information associated with imaging device 1300.

Figure 2:
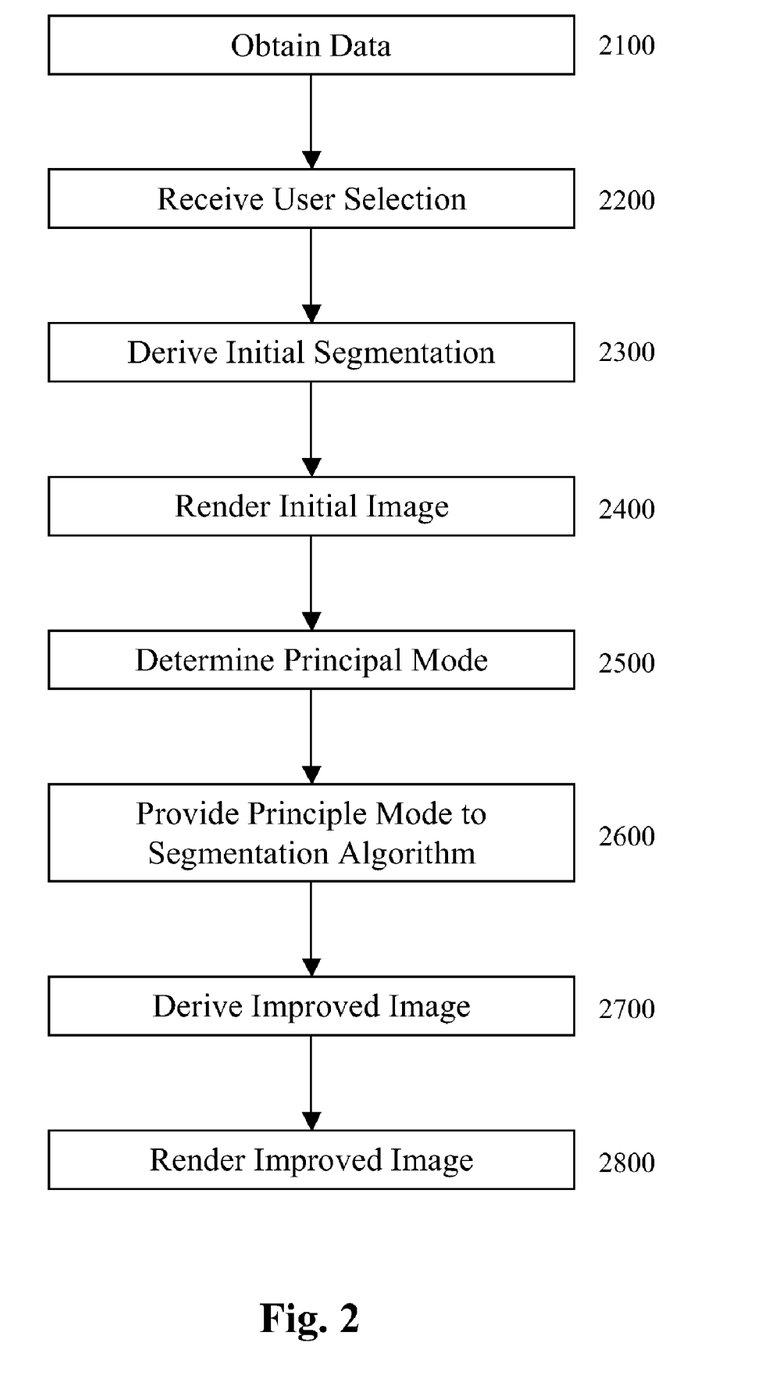
FIG. 2 is a flowchart of an exemplary embodiment of a method 2000.

FIG. 2 is a flowchart of an exemplary embodiment of a method 2000. At activity 2100, data can be obtained from an imaging device, such as a medical imaging device, at a means for processing data, such as an information device and/or a processor.

At activity 2200, a user selection of a target object can be received. The user selection can be of a point on a user interface device and/or a set of voxels of the target object comprised by the initial image. In certain exemplary embodiments, the user can provide an identification of the target object. For example, the user can enter and/or select an anatomical identification of an organ, tumor, bone, gland, and/or tissue, etc.

At activity 2300, an initial segmentation can be derived. The initial segmentation can be based on a prominent intensity of the target object. In certain exemplary embodiments, the initial segmentation can be based upon an automatic and/or user provided identification of one or more objects represented by the data obtained from the imaging device. The initial segmentation can be derived via a discriminating function, which can be adapted to classify pixels of an image as members of a target class and/or a non-target class. For example, certain exemplary discriminating functions can classify pixels based upon image intensity values. The discriminating function can be derived from an intensity distribution of a neighborhood of the data from the imaging device. The neighborhood can be automatically and/or user determined and can be based upon prior knowledge of a nature of tissue structures associated with the data obtained from the imaging device. The discriminating function can be specific to a location associated with the data obtained from the imaging device. For example, a discriminating function for a brain might be different than a discriminating function for an area surrounding a patient's liver. In an exemplary embodiment, the discriminating function for a liver tumor can be a function that classifies voxels according to a predetermined range of intensity levels known to be typical of liver tumors.

In certain exemplary embodiments, the initial segmentation can comprise a determining a background segmentation of background structures. The background segmentation can be flipped in order to derive the initial segmentation.

The initial segmentation can be derived from an intensity distribution from a neighborhood around a predetermined prominent feature of the data obtained from the imaging device. The initial segmentation can be obtained via a region growing algorithm, a watershed algorithm, a level set algorithm, and/or a graph cut algorithm, etc.

At activity 2400, an initial image can be rendered based upon the initial segmentation.

At activity 2500, a principal mode of the initial segmentation of the target object can be determined. The principal mode can be determined via an application of a mean shift algorithm that comprises an evaluation of a determined voxel intensity change within an initial segmentation of the target object. The mean shift can be iteratively determined until a principal mode is reached. In certain exemplary embodiments, the mean shift algorithm can comprise one or more evaluations of an equation:

$$(x_{i+1}, y_{i+1}, z_{i+1}) = \frac{\sum_{(u,v,w) \in Si} k(\|(u-x_i), (v-y_i), (w-z_i)\|^2) \omega(u, v, w)(u, v, w)}{\sum_{(u,v,w) \in Si} k(\|(u-x_i), (v-y_i), (w-z_i)\|^2) \omega(u, v, w)}$$

where:
$(x_i, y_i, z_i)$, $i=0, 1, 2, \ldots$, is a sequence of positions starting from a given position $(x_0, y_0, z_0)$
Si is the initial segmentation of the object;
k is a kernel function; and
$\omega$ is a weight function.

In certain exemplary embodiments, the weight function can be a triangle weight function, a cosine weight function, and/or a step weight function, etc.

At activity 2600, the principal mode of the target object can be provided to the segmentation algorithm, which can be adapted to derive the improved image of the target object.

At activity 2700, an improved image can be derived based on the principal mode.

At activity 2800, the improved image can be rendered. The improved image can be obtained and/or derived based upon the principal mode of the target object.

Obtaining consistent interactive segmentations of a target object can be a relatively difficult problem, especially when there are significant variations in intensity distribution inside of the target object. Inconsistent user interaction, which can occur in medical applications, can make segmentation consistency a significant challenge. Certain exemplary embodiments can comprise using a mean shift to achieve a consistent establishment of an initial pre-segmentation condition, such as a principal mode. The proposed technique was incorporated and validated in an exemplary interactive liver tumor segmentation algorithm, which segments target liver tumors indicated by mouse clicks. Experiments indicate that the technique performs relatively well and can be relatively robust to user interactions.

Interactive object segmentation can comprise labeling elements that belong to a target object in an input image, which can be specified by user interaction. An accurate object segmentation algorithm that can precisely and robustly label target object regions from input images constitutes an important component in certain exemplary computer vision applications. For example, segmenting a liver tumor in a computed tomography (CT) image can be an important task in computer aided liver cancer diagnosis and treatment planning. Certain exemplary embodiments can have two major objectives for an interactive object segmentation algorithm: (i) an interactive object segmentation algorithm should be accurate in locating the object in an input image and (ii) an interactive object segmentation algorithm should be able to produce consistent segmentation results that are independent of user interactions. Given a sample position or a few sample positions inside a target object, to precisely segment the target object from the background might not be an easy problem. In certain exemplary embodiments, if a target object is well isolated from background, a segmentation might be relatively easy to obtain and can be precise and consistent. Unfortunately, in certain practical applications, target objects might not be well-separated from rich backgrounds where the target objects are located, even though the target objects might be prominent in intensity distribution and/or relatively easy to identify. Certain exemplary target objects can reside next to background structures with similar intensity distributions, which might result in boundary blurriness between the target objects and the background structures. The magnitude of a gradient at boundary points can become less prominent than that of intensity variations within a target object. In certain exemplary embodiments an establishment of a criterion to identify a precise location of target object boundary can be relatively difficult. In certain exemplary embodiments, a user might not always select a same sampling position within a target object region. Locating a target object precisely can be related to corresponding image characteristics in a specific application.

In certain exemplary interactive object segmentation applications, a user interaction can be received to select a target object, which might not be consistent with selections by other users of positions and/or samples, etc. Certain exemplary embodiments can establish a mechanism to suppress such a variation. Certain exemplary embodiments can utilize a mean shift algorithm to establish a set of consistent pre-segmentation conditions based on user interactive inputs, which can enable an interactive object segmentation algorithm to consistently locate target object regions.

Figure 3:
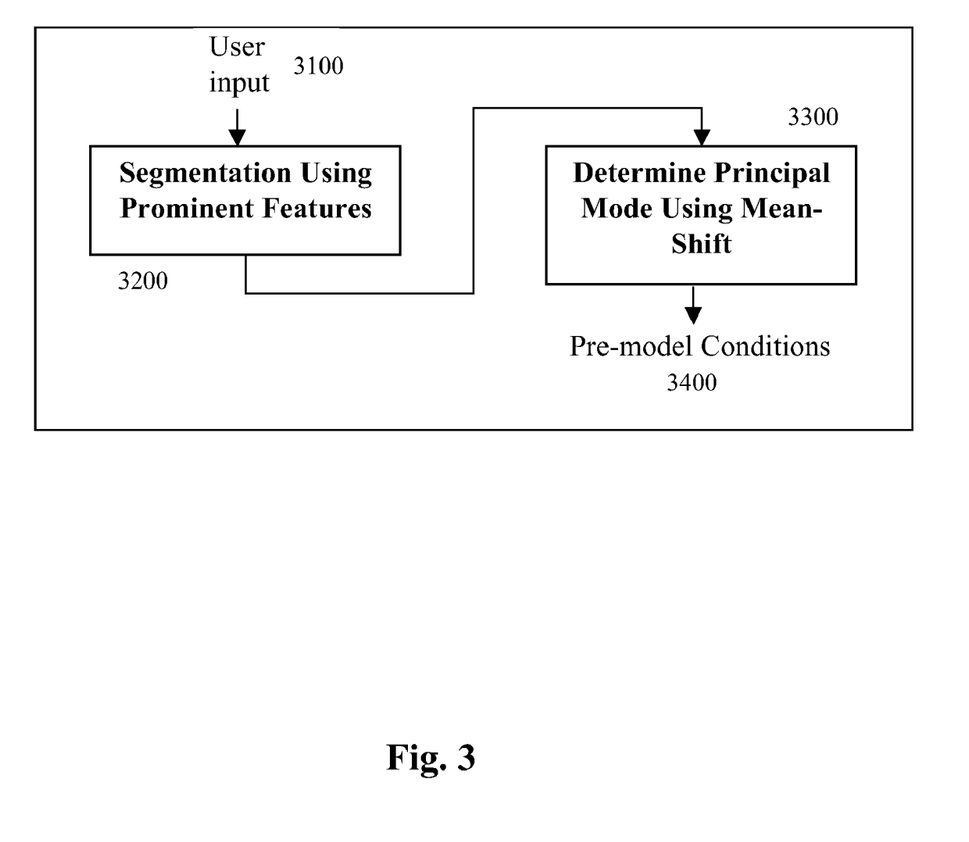
FIG. 3 is block diagram of an exemplary method 3000.

FIG. 3 is a block diagram of an exemplary embodiment of a method, 3000, which can comprise two stages. In stage 3100, the algorithm can derive a segmentation which can be based on one or more prominent features of a target object, which can comprise a prominent intensity selected via a user input. An initial segmentation might not be accurate in certain situations. However, such a segmentation can represent a prominent and stable configuration of the target object which might not be difficult to obtain in certain exemplary embodiments. In stage 3200, a mean shift algorithm can be applied to the initial segmentation to locate the principal mode. Such a principal mode can provide a stable and consistent reference location to establish stable statistical properties of the target object, which can enable an interactive object segmentation algorithm to achieve relatively consistent segmentation results regardless of user interactions.

In the following exemplary embodiment, an exemplary pre-segmentation condition (or seed for some special applications) selection technique can be detailed in a three dimensional (3D) application. The method can be extended to images of any dimension.

Let $I(x,y,z)$ denote a 3D image, where $(x, y, z)$ are bounded voxel coordinates; $(x0, y0, z0)$ denote an initial position on a target object, S, established by user interaction, which, for example, can be a position on the target object indicated by mouse click. Let $Si=\{I(x,y,z)|Fs(x,y,z)=fs\}$ be a set of voxels of size $n=|Si|$ in I, where $Fs(\ )$ represents a discriminating function of certain salient features of target objects. Si constitutes an initial segmentation of the target object S. The initial segmentation Si might not be an accurate segmentation. A significant number of target object voxels might be missing and a significant number of background voxels might be included as target object. Certain exemplary embodiments can comprise two relatively modest objectives for Si: (i) Si should capture a most prominent part of the target object and (ii) the target object should be dominant in Si around its neighborhood. In certain exemplary embodiments, Si can be readily available. In certain exemplary object segmentation applications, a rough identification of target objects based on certain prominent features can be obtained without significant difficulty. For example, in the liver tumor segmentation, such an initial segmentation can be achieved using a discriminating function derived directly from an intensity distribution from a small neighborhood around the position indicated by a mouse click. In certain situations, the initial segmentation can be achieved by identifying the prominent background structures then flipping the segmentation result. For example, in an exemplary lymph node segmentation application, relatively stable neighborhood bone structures can be relatively easy to identify. The bone structures can be used to give a relatively good identification of lymph nodes near the bone structures.

A profile k can be a piecewise, continuous, and monotonically non-increasing function which maps a non-negative read number of a non-negative real number such that $$\int_0^\infty k(r)dr < \infty.$$

A kernel K can be a function from $(x,y,z)$ to a non-negative real number such that $$K(x,y,z)=k(\|x,y,z\|^2).$$

where $\|.\|$ represents a distance measure.

Let w denote a weight function from $(x,y,z)$ to a non-negative real number. A mean shift $m(x,y,z)$ with kernel k at $(x,y,z)$ can be defined as $$m(x, y, z) = \frac{\sum_{(u,v,w)\in S} k(\|(u-x), (v-y), (w-z)\|^2) w(u, v, w)(u, v, w)}{\sum_{(u,v,w)\in S} k(\|(u-x), (v-y), (w-z)\|^2) w(u, v, w)} - (x, y, z).$$

where $m(x,y,z)$ is a local gradient at $(x,y,z)$ that points to the principal mode, which can be determined by a statistical configuration of S. Certain exemplary embodiments can denote $(x_i, y_i, z_i)$, $i=0, 1, 2, \ldots$, a sequence of positions starting from a given position $(x_0, y_0, z_0)$ and being generated in iterative process $$(x_{i+1}, y_{i+1}, z_{i+1}) = (x_i, y_i, z_i) + m(x_i, y_i, z_i).$$

$(x_i, y_i, z_i)$ reaches the principal mode when $m(x_i, y_i, z_i) = 0$ regardless of the initial position $(x_0, y_0, z_0)$, which can be a desirable property for pre-segmentation condition selection.

In certain exemplary embodiments, kernel function can be relatively simple for a number of considerations, which can comprise robustness, accuracy, speed, and/or efficiency, etc. Certain exemplary embodiments can utilize a Gaussian kernel or a step kernel, which can be suitable for certain exemplary applications. A factor that might be considered is a kernel bandwidth, which can be related to a size of the target object. In certain applications, an exact size of a target object might not be readily available. In certain exemplary embodiments, as long as a general idea of the size of target objects can be known, a relatively large bandwidth can be maintained. A weight function can be related to an application scenario. Generally, a weight function can put more of an emphasis on features that are most prominent.

Certain exemplary embodiments can be utilized in a liver tumor segmentation algorithm. Comparison tests were performed on four sets of liver CT images with a resolution of approximately 0.8 millimeters×0.8 millimeters×5 millimeters, which were obtained from different sources. A total of 40 tumors were present among which 10 target objects were manually segmented by two physicians. Segmentation consistency numbers were tested for the liver tumor segmentation algorithms with and without utilizing a mean-shift seed selection algorithm.

The performance criteria used in the tests to assess the segmentation consistency to user interaction can be defined by the following equation:

$$r = \text{MEAN}\left\{1 - \left|\frac{C(S_{(x',y',z')}) - C(S_{(x,y,z)})}{C(S_{(x',y',z')})/2 + C(S_{(x,y,z)})/2}\right|\right\}, \quad (1)$$

where $C(*)$ represents the number of voxels. $S_{(x,y,z)}$ and $S_{(x',y',z')}$ represent two segmentation results using two different initial positions, $(x,y,z)$ and $(x',y',z')$, respectively. In the tests, r was estimated using 15 tumors with each tumor being segmented approximately 15 times. An average segmentation consistency was determined to be approximately 97 percent for the liver segmentation algorithm with mean shift seed selection algorithm incorporated as compared to an average segmentation consistency of approximately 88 percent for the liver segmentation algorithm without pre-condition normalization utilizing the mean shift seed selection algorithm.

In certain exemplary embodiments, a mean shift technique can improve the consistency of interactive object segmentation. Certain exemplary embodiments can establish initial pre-segmentation conditions utilizing a mean shift algorithm. The proposed technique was incorporated in an exemplary liver tumor segmentation algorithm, which received a mouse-click to specify a target liver tumor. Test results indicate that the algorithm can be relatively robust to user interaction variations and can result in a relatively high consistency in liver tumor segmentation.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, deed, function, step, and/or process and/or a portion thereof.

adapted—suitable, fit, and/or capable of performing a specified function.

adapted to—suitable, fit, and/or capable of performing a specified function.

and/or—either in conjunction with or in alternative to.

apparatus—an appliance or device for a particular purpose application—the act of putting something to a use and/or purpose; and/or a set of computer-readable instructions and/or a computer program.

applied—incident directly and/or indirectly upon.

around—on all sides.

associate—to join, connect together, and/or relate.

automatically—acting and/or operating in a manner essentially independent of external human influence and/or control. For example, an automatic light switch can turn on upon "seeing" a person in its view, without the person manually operating the light switch.

automatically—acting or operating in a manner essentially independent of external influence or control. For example, an automatic light switch can turn on upon "seeing" a person in its view, without the person manually operating the light switch.

background—portions of an image not comprised by a principle object of interest.

based upon—determined in consideration of and/or derived from.

can—is capable of, in at least some embodiments.

cause—to produce an effect.

change—(v.) to cause to be different; (n.) the act, process, and/or result of altering or modifying.

comprised by—included by.

comprises—includes, but is not limited to, what follows.

comprising—including but not limited to, what follows.

computed tomography device—an apparatus adapted to obtain radiographic measurements from many angles, the radiographic measurements adapted to be combined to form an image.

configure—to make suitable or fit for a specific use or situation.

convert—to transform, adapt, and/or change.

coordinate—any of a set of two or more numbers used to determine the position of a point, line, curve, or plane in a space of a given dimension with respect to a system of lines or other fixed references.

cosine weight function—a function adapted to provide a value indicative of importance, the function at least partially defined by an infinite series $1-(x^2/2!)+(x^4/4!)-+\ldots$, where ! denotes factorial.

create—to bring into being.

data—information represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the outline, form, or structure of.

derive—obtain via determining, calculating, and/or looking-up.

determine—to obtain, calculate, decide, deduce, and/or ascertain.

device—an instrumentality adapted to a particular purpose.

discriminating function—a defined mathematical relationship descriptive of an image of an object.

distribution—the process of supplying electrical power to users.

enhance—to improve or make better.

equation—a statement asserting the equality of two expressions, usually written as a linear array of symbols that are separated into left and right sides and joined by an equal sign.

estimate—to calculate and/or determine approximately and/or tentatively.

evaluation—a determination of a value.

flipping—a mathematical method related to an image wherein one or more determined foreground objects of the image are switched to a background and/or voxels not associated with the one or more determined foreground objects are classified as an object of interest.

for—with a purpose of.

from—used to indicate a source.

further—in addition.

Gaussian weight function—a function adapted to provide a value indicative of importance, the function having a form (for real constants such that a is greater than zero, b, and c):

$$f(\chi)=ae^{-(\chi-b)^2/c^2}$$

generate—to create, produce, give rise to, and/or bring into existence.

graph cut algorithm—a method adapted to simplify an image via a determination of one or more cross sections of a mathematical model of the image.

growing—increasing a size of haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

identification—evidence of identity, such as a moniker, description, designation, and/or characteristics, and/or something that uniquely and/or substantially uniquely identifies a person and/or thing.

image—an at least two-dimensional representation of an entity and/or phenomenon.

improve—to cause a more desired state and/or condition.

improvement—in a more desired state or condition.

indicate—to show, mark, signal, signify, denote, evidence, evince, manifest, declare, enunciate, specify, explain, exhibit, present, reveal disclose, and/or display.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initial—at a beginning.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrators tactile simulator, and/or tactile pad, potentially including a port to which an I/O device can be attached or connected.

intensity—a strength and/or brightness of a voxel.

kernel—a transition function of a (usually discrete) stochastic process. Often, a kernel is assumed to be independent and identically distributed, and thus a probability density function.

level set algorithm—a method adapted to enhance curves and/or surfaces that might undergo topological changes.

location—a place.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed and/or permitted to, in at least some embodiments.

mean shift algorithm—a method adapted to change a characteristic of a particular image voxel to be more similar to one or more neighboring image voxels.

medical—of or relating to the study or practice of medicine.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

model—a mathematical and/or schematic description of an entity and/or system.

more—greater.

neighborhood—an area or region close, adjacent, and/or approximately adjacent to a predetermined location.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

object—a physical thing; an item associated with a radio frequency identification tag; a grouping of data and/or executable instructions; and/or a discrete graphical item that can be selected and maneuvered, such as an onscreen graphic.

obtain—to receive, get, take possession of, procure, acquire, calculate, determine, and/or compute.

one—a singular item.

packet—a discrete instance of communication.

plurality—the state of being plural and/or more than one.

plurality—the state of being plural and/or more than one.

predetermined—established in advance.

principle mode—a reference location in a target object determined based upon a statistical mode of voxel intensities.

prior—earlier in time.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

profile—a representation, outline, and/or description of an object, structure, and/or surface.

project—to calculate, estimate, or predict.

prominent feature—a feature that is distinct from surrounding features.

prominent intensity—a voxel intensity that is distinct from surrounding voxel intensities.

provide—to furnish, supply, give, and/or make available.

providing—furnishing or supplying.

receive—to get as a signal, take, acquire, and/or obtain.

receiving—obtaining, taking, and/or acquiring.

recommend—to suggest, praise, commend, and/or endorse.

region growing algorithm—a method adapted to change a size of a continuous part of a representation of an object up to a limit associated with one or more predetermined criteria.

render—to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc.

repeatedly—again and again; repetitively.

represent—to describe and/or symbolize.

request—to express a desire for and/or ask for.

said—when used in a system or device claim, an article indicating a subsequent claim term that has been previously introduced.

segmentation—a determination of whether a pixel is part of a target object or is merely part of a background of the target object.

select—to make a choice or selection from alternatives.

selection—(v.) the act of choosing and/or selecting and/or an assortment of things from which a choice can be made; (n.) a choice.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

step weight function—a function adapted to provide a value indicative of importance, the function having a form comprising discrete and piecewise continuous value changes.

store—to place, hold, and/or retain data, typically in a memory.

structures—such as a building, a machine, a piece of equipment, an aircraft, a ship, a vehicle, military equipment, a storage vessel, a pipeline, a bridge, and/or an electrical conduit.

substantially—to a great extent or degree.

system—a collection of mechanisms, devices, data, and/or instructions, the collection designed to perform one or more specific functions.

target—a destination.

that—a pronoun used to indicate a thing as indicated, mentioned before, present, and/or well known.

to—a preposition adapted for use for expressing purpose.

transmit—to send as a signal, provide, furnish, and/or supply.

triangle weight function—a function adapted to provide a value indicative of importance, the function having a form comprising a first monotonically increasing portion and a second monotonically decreasing portion.

user—a person, organization, process, device, program, protocol, and/or system that uses a device, system, process, and/or service.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc.

A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

vector—an expression characterized by a magnitude and a direction.

via—by way of and/or utilizing.

voxel—a finite volume in three dimensional space representing a resolvable and/or renderable volume associated with a predetermined system.

watershed algorithm—a method for delineating objects within an image via filling a "landscape" of data with disjoint puddles formed via a model adapted to simulate a pouring of water over a landscape of the image. Whenever two puddles meet, a representation of a dam (so-called watershed) is constructed to separate the two puddles.

weight—a value indicative of importance.

where—in a situation or position.

wherein—in regard to which; and; and/or in addition to.

within—inside

What is claimed is:

1. A method comprising:
obtaining data from a computed tomography device;
receiving a user selection of a set of voxels of a target object comprised by said initial image;
deriving an initial segmentation of said target object, said initial segmentation based on a prominent intensity of said target object;
rendering an initial image based upon said initial segmentation;
determining a principal mode from a prior segmentation via a mean shift algorithm that comprises an evaluation of a determined voxel intensity change within said initial segmentation, wherein said mean shift algorithm comprises an evaluation of an equation:

$$(x_{i+1}, y_{i+1}, z_{i+1}) = \frac{\sum_{(u,v,w) \in Si} k(\|(u-x_i), (v-y_i), (w-z_i)\|^2) \omega(u,v,w)(u,v,w)}{\sum_{(u,v,w) \in Si} k(\|(u-x_i), (v-y_i), (w-z_i)\|^2) \omega(u,v,w)}$$

where
$(x_i, y_i, z_i)$, $i = 0, 1, 2, \ldots$, is a sequence of positions starting from a given position $(x_0, y_0, z_0)$
Si is said initial segmentation of said object;
k is a kernel function; and
$\omega$ is a weight function;
providing said principal mode to an algorithm that is adapted to derive an improved image of said target object; and
rendering said improved image of said target object.

2. The method of claim 1, wherein the step of deriving an improved image of a target object further comprises:
automatically determining an improved image of a target object, said improved image determined based upon a principal mode of said target object, said principal mode of said target object provided to an algorithm that is adapted to derive said improved image of said target object, said principal mode determined from data obtained from a computed tomography device, said principal mode determined via an application of a mean shift algorithm that comprises an evaluation of a determined voxel intensity change within an initial segmentation of said target object.

3. The method of claim 1, further comprising:
obtaining said data from said computed tomography device.

4. The method of claim 1, further comprising:
receiving a user selection of a set of voxels from said target object.

5. The method of claim 1, further comprising:
receiving a user identification of said target object.

6. The method of claim 1, further comprising:
determining said initial segmentation of said target object.

7. The method of claim 1, further comprising:
determining said initial segmentation of said object based upon a user identification of said data from said computed tomography device.

8. The method of claim 1, further comprising:
flipping a segmentation of one or more background structures to obtain said initial segmentation of said target object.

9. The method of claim 1, further comprising:
deriving said initial segmentation of said object from an intensity distribution from a neighborhood around a predetermined prominent feature of said data obtained from said computed tomography device.

10. The method of claim 1, further comprising:
deriving said initial segmentation via a region growing algorithm.

11. The method of claim 1, further comprising:
deriving said initial segmentation via a watershed algorithm.

12. The method of claim 1, further comprising:
deriving said initial segmentation via a level set algorithm.

13. The method of claim 1, further comprising:
deriving said initial segmentation via a graph cut algorithm.

14. The method of claim 1, wherein said weight function is a Gaussian weight function.

15. The method of claim 1, wherein said weight function is a triangle weight function.

16. The method of claim 1, wherein said weight function is a cosine weight function.

17. The method of claim 1, wherein said weight function is a step weight function.

18. A computer-readable medium embodying computer executable instructions for activities comprising:

automatically determining an improved image of a target object, said improved image determined based upon a principal mode of said target object, said principal mode of said target object provided to an algorithm that is adapted to derive said improved image of said target object, said principal mode determined from data obtained from a computed tomography device, said principal mode determined via an application of a mean shift algorithm that comprises an evaluation of a determined voxel intensity change within an initial segmentation of said target object, wherein said mean shift algorithm comprises an evaluation of an equation:

$$(x_{i+1}, y_{i+1}, z_{i+1}) = \frac{\sum_{(u,v,w)\in Si} k(\|(u-x_i), (v-y_i), (w-z_i)\|^2)\omega(u, v, w)(u, v, w)}{\sum_{(u,v,w)\in Si} k(\|(u-x_i), (v-y_i), (w-z_i)\|^2)\omega(u, v, w)}$$

where $(x_i, y_i, z_i)$, i=0, 1, 2, ..., is a sequence of positions starting from a given position $(x_0, y_0, z_0)$ Si is said initial segmentation of said object;

k is a kernel function; and

ω is a weight function.

19. A system comprising:

a processing means for determining an improved image of a target object, said improved image determined based upon a principal mode of said target object, said principal mode of said target object provided to an algorithm that is adapted to derive said improved image of said target object, said principal mode determined from data obtained from a computed tomography device, said principal mode determined via an application of a mean shift algorithm that comprises an evaluation of a determined voxel intensity change within an initial segmentation of said target object, wherein said mean shift algorithm comprises an evaluation of an equation:

$$(x_{i+1}, y_{i+1}, z_{i+1}) = \frac{\sum_{(u,v,w)\in Si} k(\|(u-x_i), (v-y_i), (w-z_i)\|^2)\omega(u, v, w)(u, v, w)}{\sum_{(u,v,w)\in Si} k(\|(u-x_i), (v-y_i), (w-z_i)\|^2)\omega(u, v, w)}$$

where $(x_i, y_i, z_i)$, i=0, 1, 2, ..., is a sequence of positions starting from a given position $(x_0, y_0, z_0)$ Si is said initial segmentation of said object;

k is a kernel function; and

ω is a weight function; and a user interface adapted to render said improved image.

* * * * *